US006296451B1

(12) United States Patent
Guillet-Belaud et al.

(10) Patent No.: US 6,296,451 B1
(45) Date of Patent: Oct. 2, 2001

(54) PROCESS AND INSTALLATION FOR THE REGULATION OF A CENTRAL UNIT FOR THE PRODUCTION OF MEDICAL VACUUM

(75) Inventors: Emmanuel Guillet-Belaud, Paris; Robert Montausier, Vauréal; Didier Beauvois, Paris, all of (FR)

(73) Assignee: Air Liquide Sante (International), Paris (FR)

( * ) Notice: Subject to any disclaimer, the term of this patent is extended or adjusted under 35 U.S.C. 154(b) by 0 days.

(21) Appl. No.: 09/484,274

(22) Filed: Jan. 18, 2000

(30) Foreign Application Priority Data

Feb. 2, 1999 (FR) .................................................. 99 01164

(51) Int. Cl.[7] ............................. F04B 19/24; F04B 53/00
(52) U.S. Cl. ............................................. 417/53; 417/313
(58) Field of Search ........................ 417/53, 313; 137/14, 137/487.5

(56) References Cited

U.S. PATENT DOCUMENTS

| 4,443,183 | * | 4/1984 | Shimizu et al. ...................... 431/354 |
| 4,701,192 | | 10/1987 | Burke ..................................... 96/402 |
| 4,991,253 | | 2/1991 | Rechsteiner ............................ 15/301 |
| 5,137,604 | * | 8/1992 | Meeks et al. ......................... 202/205 |
| 5,142,483 | * | 8/1992 | Basham et al. ......................... 702/47 |
| 5,245,857 | | 9/1993 | Kahl .................................... 73/23.2 |
| 5,279,601 | * | 1/1994 | Lichte ................................. 604/319 |
| 5,813,426 | | 9/1998 | Tan et al. ............................... 137/14 |

FOREIGN PATENT DOCUMENTS

| 24 17 183 | 10/1975 | (DE) . |
| 0 442 383 | 8/1991 | (EP) . |
| 58-110917 | * 7/1983 | (JP) . |

* cited by examiner

Primary Examiner—Timothy S. Thorpe
Assistant Examiner—Michael K. Gray
(74) Attorney, Agent, or Firm—Young & Thompson

(57) ABSTRACT

A process and installation for the regulation of the vacuum level prevailing in a network of vacuum conduits in a hospital building comprises one or several vacuum pumps connected pneumatically to the vacuum conduits (CV); elements (C2) for determining the pressure to determine the underpressure prevailing in the vacuum conduits (CV); a pilot device (MP) controlling at least one vacuum pump, at least one line for connection to the atmosphere (L1, L2) having a first end connected pneumatically to the vacuum conduits and having a second free end; and control elements (EV1, EV2) for the flow of fluid arranged in the line for connection to the atmosphere (L1, L2) to permit controlling the passage of air in the line connecting to the atmosphere.

11 Claims, 3 Drawing Sheets

PROCESS AND INSTALLATION FOR THE REGULATION OF A CENTRAL UNIT FOR THE PRODUCTION OF MEDICAL VACUUM

FIELD OF THE INVENTION

The present invention relates to a process and installation for the regulation of the pressure level prevailing in a vacuum conduit or network of vacuum conduits, in particular located within a hospital building, said pressure level being adapted to vary in the course of time, particularly in the case of high demand for vacuum thus distributed to one or several user sites.

BACKGROUND OF THE INVENTION

It is known to use vacuum and the properties of vacuum in numerous sectors of industry, particularly in the medical field or the food field.

Thus, in the medical field, hospital buildings are often traversed by a network of vacuum conduits permitting bringing a source of underpressure, which is to say vacuum, to the hospital rooms or the operating rooms at which said source of underpressure or vacuum can be used for various and sundry ends, for example to be used in the aspiration of body fluids by means of suitable instruments, for example during a surgical procedure or the like.

However, the problem which is conventionally faced is that of being able to control the level of underpressure, which is to say vacuum, prevailing in the network of vacuum conduits, so as to be able to ensure, at the user sites, a pressure level sufficiently low to be able to ensure the various applications to which the vacuum is destined, in general a level of underpressure or vacuum less than $0.5 \times 10^5$ Pa.

To solve this problem, several installations and processes for regulation have already been proposed.

Thus, there is known an installation or central unit for a medical vacuum permitting maintaining a level of underpressure less than $0.5 \times 10^5$ Pa in one or several vacuum conduits, comprising one or several vacuum pumps connected pneumatically to said vacuum conduits, means for determining the pressure in said vacuum conduits and transmitting information as to pressure to pilot means controlling the operation or the stopping of the vacuum pump or pumps as a function of the pressure level detected by said means for determining pressure.

However, this type of device, although simple in its design, has the drawback of requiring moreover the use of several storage capacities of large volume connected to the vacuum conduits, so as to be able to respond substantially instantaneously to high demand at the user sites for vacuum and/or to avoid rapid deterioration of the vacuum pumps.

Thus, the operation of the installation sites requires fairly abrupt and incessant starting of the vacuum pumps to permit adjusting the level of underpressure, which is to say the vacuum level, in the vacuum conduits between a maximum pressure value and a minimum desired pressure value, said frequent starts of these pumps carrying the risk of rapidly damaging the motors driving said vacuum pumps.

Because of this, to avoid this problem, it is necessary to add several buffer capacities of large volume, so as to minimize the frequency of starting said pumps; the network of vacuum conduits having a too small buffer capacity to be able to perform by itself this role.

It is easy to understand that the fact of having to provide several buffer capacities of large volume gives rise to drawbacks, namely large size due to the size of these buffer capacities, which gives rise to difficulty of transporting these capacities to user sites and difficulty of installing these buffer capacities which require a large space, in general an area especially adapted to receive them.

So as to solve the problems existing with this type of installation, it has been proposed to add electrovalves at the outlet of each vacuum pump.

Because of this, each vacuum pump operates during a predetermined time, for example 6 to 10 minutes, during which the electrovalve is in the open position, which permits being able to decrease the pressure to the desired value of underpressure.

Then, when the desired value of underpressure is reached, the electrovalve closes whilst the vacuum pump continues to operate for the predetermined period, for example 6 to 10 minutes, after which the pump stops.

When the pressure level again reaches a maximum threshold of underpressure, the electrovalve opens again and the preceding steps are repeated.

However, it has been noted that the use of electrovalves between each vacuum pump and the conduit to which is connected each vacuum pump, gives rise to large problems of pressure drop which cause a large decrease of output of each of said vacuum pumps, which can amount to 10% or even more.

Moreover, the electrovalves that exist at present are subject to problems of reliability, in particular in the case of membrane electrovalves, because these latter are not especially designed for pressures below $10^5$ Pa, which is to say for vacuum.

Although it would be possible to replace membrane electrovalves by electrovalves better adapted to vacuum, such as so-called "slide valve" electrovalves, these latter are, on the one hand, of a fairly high cost, and on the other hand, do not permit solving the problem of operation for vacuum pumps, when the electrovalve is closed and when, on the other hand, the predetermined operating time of the vacuum pump has not totally elapsed.

OBJECT OF THE INVENTION

The object of the present invention is therefore to overcome the above problems, which is to say to provide a process and an installation for the regulation of the level of underpressure prevailing in at least one portion of at least one vacuum conduit or in a network of vacuum conduits in which the level of underpressure, which is to say the vacuum level, is adapted to vary in the course of time, in particular because of the use of a portion of the vacuum by one or several user sites located downstream of said vacuum conduit or said network of vacuum conduits.

SUMMARY OF THE INVENTION

The present invention thus relates to an installation for the regulation of the level of underpressure prevailing in at least one portion of at least one vacuum conduit in which said level of underpressure is adapted to vary with time, comprising:

at least one vacuum conduit, at least one vacuum pump pneumatically connected to said vacuum conduit, means for determining the pressure to determine the underpressure prevailing in at least one portion of said vacuum conduit, pilot means controlling (stopping, starting . . .) at least one vacuum pump, preferably several vacuum pumps, at least one line for connection to the atmosphere having a first end connected pneumatically to said vacuum conduit and having a second free end, and means for controlling the passage of fluid arranged in at least said line for communication with the atmosphere to permit controlling the passage of a gaseous fluid through said line for communication with the atmosphere.

As the case may be, the installation according to the invention can comprise one or several of the following characteristics:

it comprises from 2 to 15 vacuum pumps connected pneumatically to said vacuum conduit, preferably 3 to 9 vacuum pumps, in particular several of said vacuum pumps are arranged in parallel;

it comprises several lines for communication with the atmosphere each having a first end connected pneumatically to at least one vacuum conduit and a second free end;

at least one line for connection to the atmosphere comprising a calibrated orifice, preferably each of the lines for communication with the atmosphere comprising a calibrated orifice, at least two of said calibrated orifices having an identical or different diameter;

the means for controlling the passage of fluid are selected from the group consisting of electrovalves and pneumatic valves;

the control means for the passage of fluid are controlled by said pilot means;

the means for controlling the passage of fluid are controlled by said pilot means, in a combined or autonomous manner, preferably autonomous;

it comprises several vacuum conduits, preferably said vacuum conduits form a network of vacuum conduits in a building, in particular a hospital building;

it comprises moreover at least one buffer capacity arranged in at least one vacuum conduit, silencing means arranged at the inlet end of the atmospheric air in the line or lines for connection to the atmosphere.

Moreover, the present invention also relates to a process for regulating the level of underpressure prevailing in at least one portion of at least one vacuum conduit in which said level of underpressure is adapted to vary with time, in which:

(a) a value of underpressure prevailing in at least one portion in at least the vacuum conduit is determined, (b) the value of underpressure determined in step (a) is compared with a predetermined maximum value of underpressure (VDmax) wherein VDmax<$10^5$ Pa, (c) when in step (b) VD$\geq$VDmax, a pressure decrease is carried out in said vacuum conduit by pneumatic pumping by means of at least one vacuum pump connected pneumatically to at least one portion of said vacuum conduit, (d) when the value of underpressure prevailing in at least one portion of at least one vacuum conduit subjected to pumping in step (c) is such that: VD$\leq$VDmini, wherein VDmini is a predetermined minimum value of underpressure wherein: VDmini<VDmax<$10^5$ Pa, (i) at least one vacuum pump is stopped that is operated for a predetermined period of time; and/or (ii) at least one portion of said vacuum conduit is placed in pneumatic communication with a source of gas, preferably air, having a compensation pressure such that: Pc>VDmax, whilst continuing to perform a pneumatic pumping by means of at least one vacuum pump connected pneumatically to at least one portion of said vacuum conduit.

As the case may be, the process according to the invention can comprise one or several of the following characteristics:

in step (d), the source of gas having a compensation pressure is the atmosphere, preferably the placing in pneumatic communication of the vacuum conduit with the atmosphere takes place by means of at least one line for communication with the atmosphere having a first end connected pneumatically to said vacuum conduit and having a second free end;

the passage of a gas flow through at least one line in connection with the atmosphere is controlled by o control means for the passage of fluid arranged in at least said line for communication with the atmosphere and/or in that the flow rate of the passage of the gaseous flow through at least one line for communication with the atmosphere is carried out by means of at least one calibrated orifice arranged in said line for communication with the atmosphere;

VDmini is comprised between 30,000 Pa and 38,000 Pa;

VDmax is comprised between 42,000 Pa and 50,000 Pa; and/or dt is comprised between 1 and 120 minutes, preferably between 5 and 90 minutes.

According to another aspect, the invention also relates to the use of the installation according to the invention or of a process according to the invention, to regulate or adjust the level of pressure, which is to say the vacuum, within a network of vacuum conduits traversing a hospital building.

BRIEF DESCRIPTION OF THE DRAWINGS

The present invention will now be described in greater detail with the help of the accompanying drawings, given by way of illustration, but not limiting the invention, among which

DETAILED DESCRIPTION OF THE INVENTION

Figure 1:
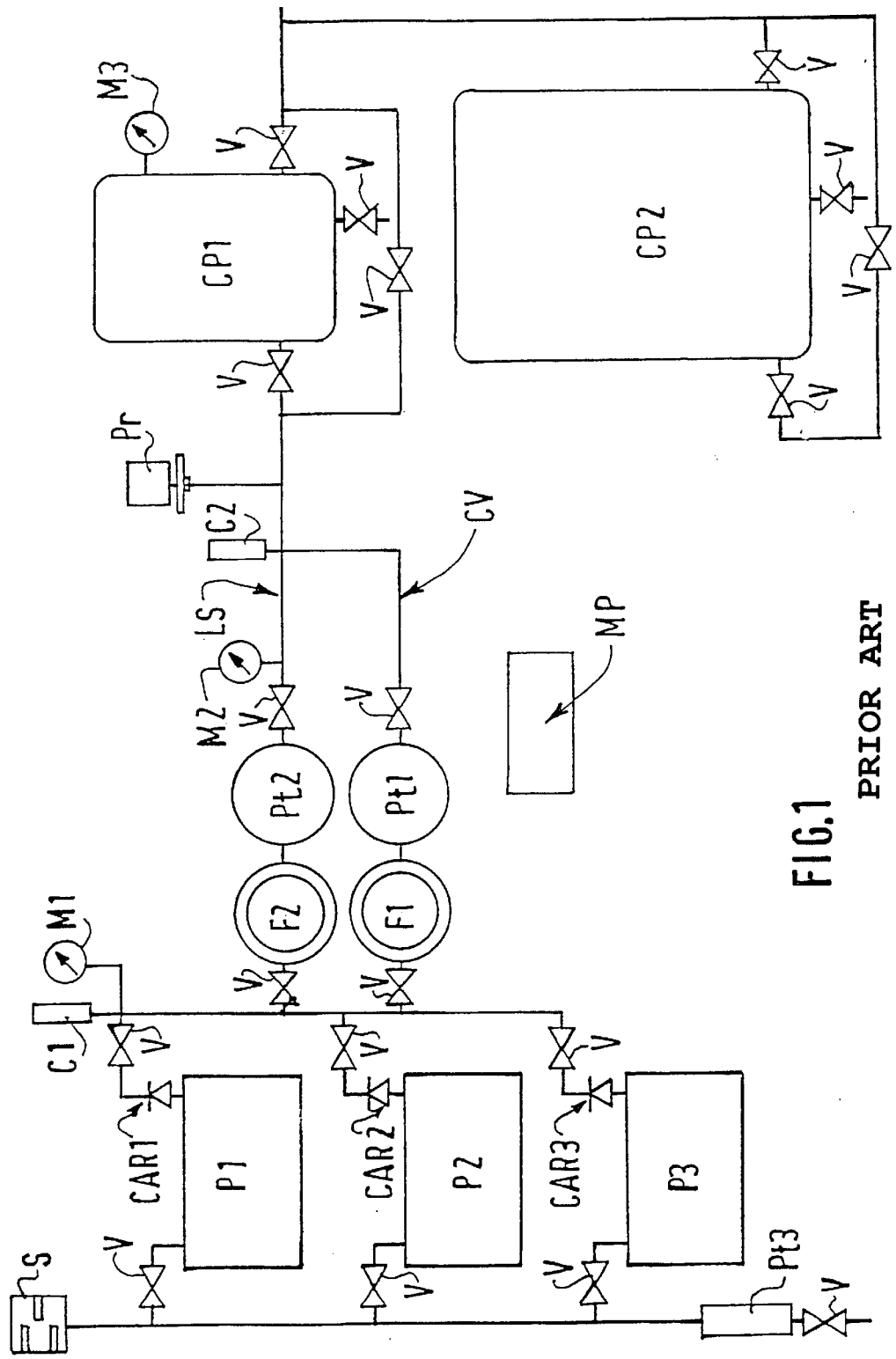
FIGS. 1 and 2 show diagrams for an installation according to the prior art, whilst

More precisely, FIG. 1 shows the diagram of an installation according to the prior art of the type comprising several buffer capacities of large volume.

This installation or medical vacuum central unit is comprised schematically of 3 vacuum pumps P1, P2, P3 in parallel, connected to a vacuum conduit, in which are arranged two buffer capacities CP1, CP2 of large volume.

Moreover, it will be seen that the installation also comprises valves V, for example of the quarter-turn ball valve type, corresponding pressure detectors C1, C2, a pressostat Pr, manometers M1, M2, M3, as well as non-return valves CAR1, CAR2, CAR3 arranged upstream of vacuum pumps P1, P2, P3.

The installation also comprises a safety vacuum line LS permitting overcoming any deficiency in the vacuum conduit CV and permitting maintenance of said vacuum conduit CV, in particular changing the bacterial filter F1 and emptying the sump Pt1 whose function is to recover or collect any liquid or solid effluents.

The safety line LS also comprises a bacterial filter and a sump Pt2.

Moreover, the vacuum pumps P1 to P3 are connected downstream, to an evacuation conduit for gases pumped by said pumps P1 to P3, which line is provided with a silencer S by which the gases are vented to the atmosphere and a sump Pt3 provided with an emptying valve V.

As explained above, this type of installation has the drawback of using buffer capacities of large volume adapted to avoid damage to the motors of vacuum pumps P1 to P3.

Figure 2:
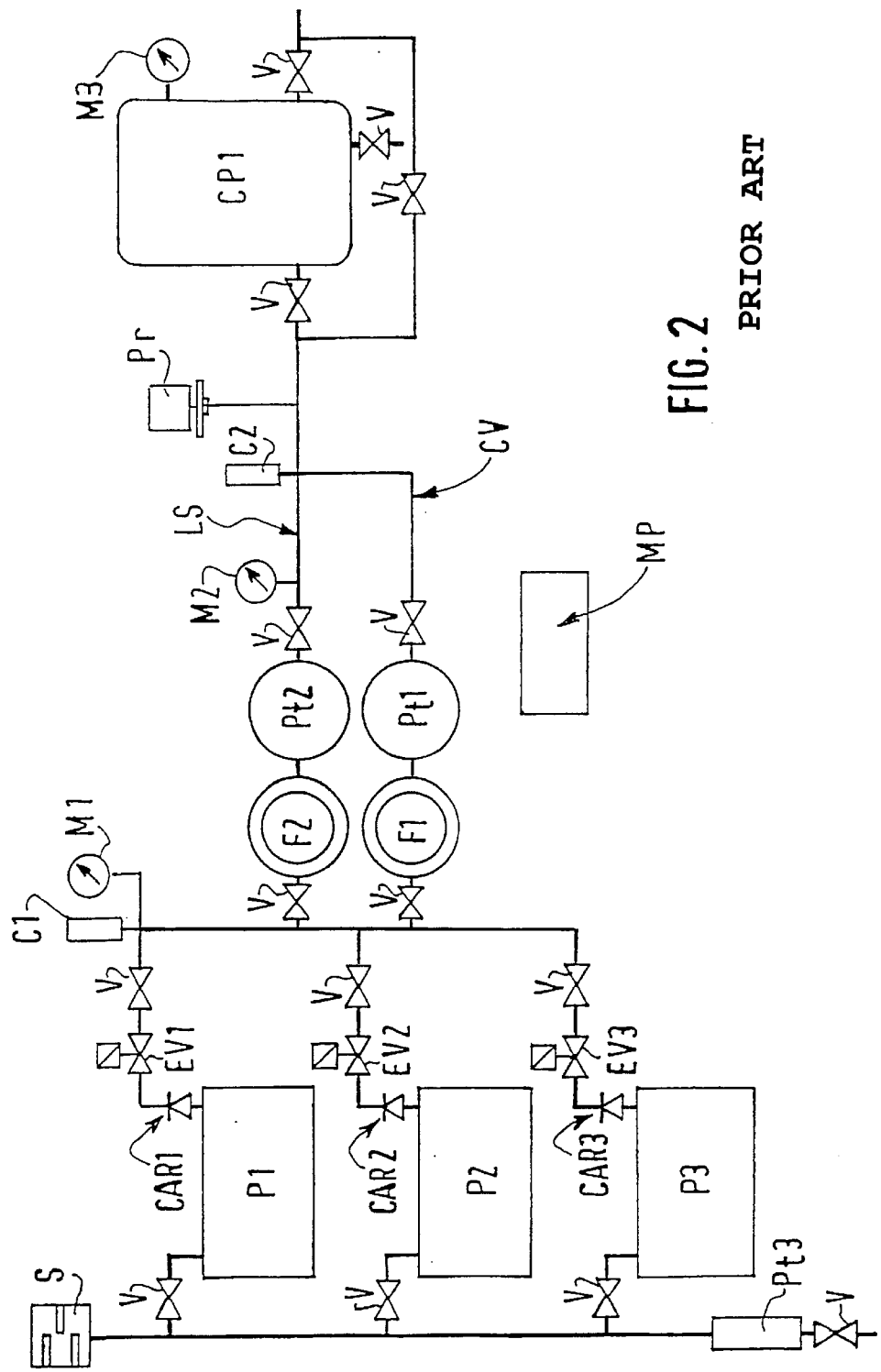

FIG. 2 itself shows a diagram of an installation according to the prior art, substantially analogous to that of FIG. 1, except for the fact that the two buffer capacities CP1 and CP2 of large volume shown in FIG. 1, have been omitted and replaced by a single buffer capacity CP1 of smaller volume.

Moreover, it will be noted that as explained above, the electrovalves EV1, EV2 and EV3 have been installed respectively upstream of each of the pumps P1, P2 and P3, so as to be able to compensate the overpressure of the buffer capacities of large volume.

As explained above, this type of installation has the drawbacks, on the one hand, of giving rise to large pressure drops having a negative input on the efficiency of each of the vacuum pumps and, on the other hand, leading to a fairly frequent replacement of the electrovalves when these latter are not provided specially for a vacuum network or, as the case may be, making necessary the use of electrovalves designed for vacuum but whose cost is very high.

Moreover, another drawback of the device of FIG. 2 is that the vacuum pumps continue to operate even when the electrovalves EV1 to EV3 are in the closed position.

Figure 3:
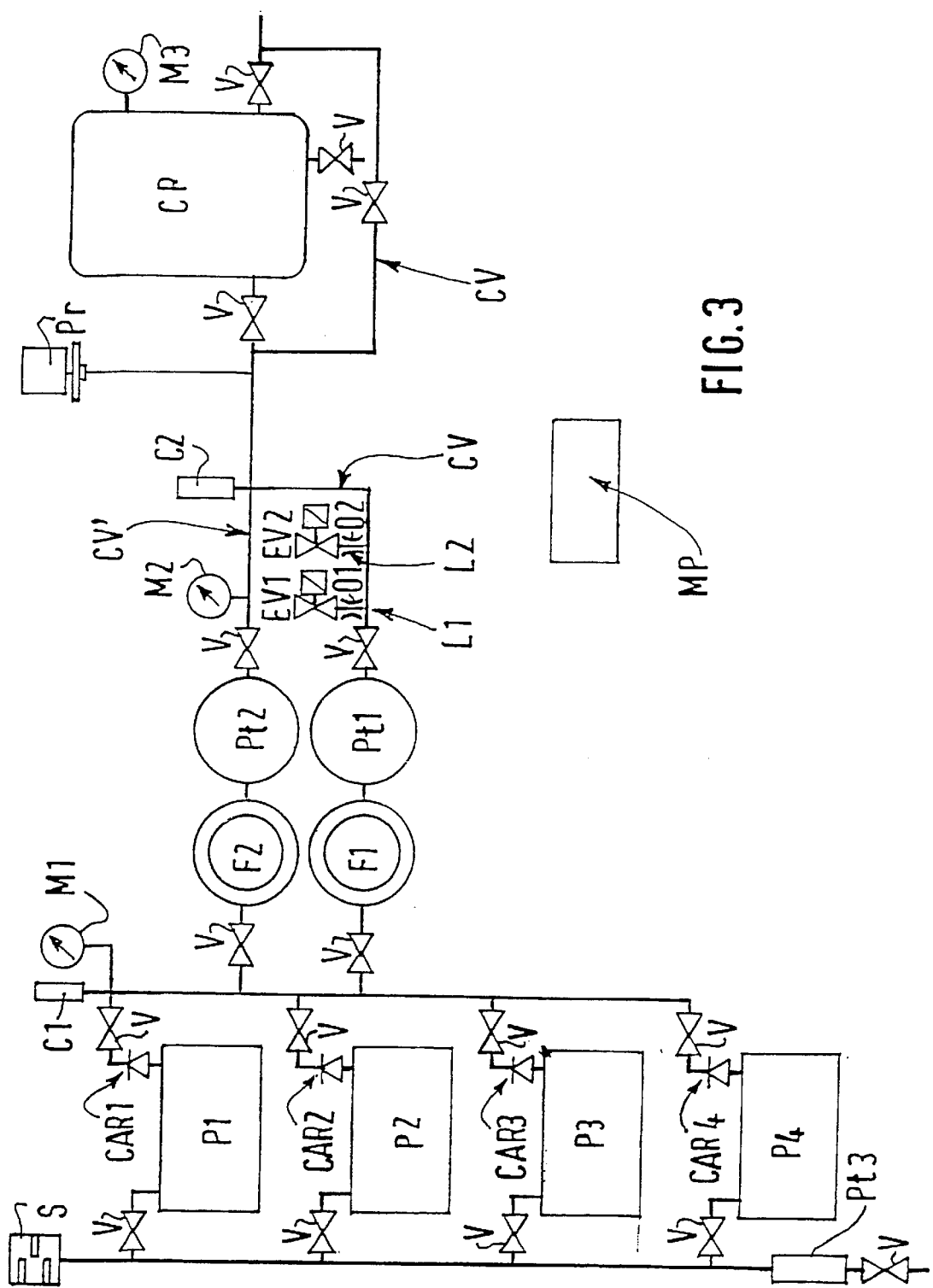
FIG. 3 shows an installation according to the prevent invention.

The solution provided by the present invention is shown in FIG. 3, which is analogous to FIG. 2, except that the electrovalves EV1, EV2 and EV3 upstream of the vacuum pumps have been omitted, whilst the supplemental lines L1 and L2 have been added to the vacuum conduit CV.

More precisely, the lines Li and L2 each have one of their ends connected pneumatically to the vacuum conduit CV and the other ends free, which is to say communicating pneumatically with the atmosphere.

Moreover, each of the lines L1 and L2 communicating with the atmosphere, comprises a silencing device arranged at the level of the inlet end for air, as well as control means for the passage of fluid, which is to say air, for example electrovalves controlled by pilot means MP and moreover each comprising a calibrated orifice O1, O2, respectively.

Finally, the number of vacuum pumps present in the installation has been increased, but the vacuum pumps according to the present invention are smaller than those of the arrangements proposed by the prior art, with identical flow rate of vacuum use.

According to the present invention, there are used five vacuum pumps each of 40 m$^3$/h, whilst in the prior art according to FIG. 1 or FIG. 2, there are used 3 vacuum pumps each of 100 m$^3$/h.

Because of this, the device according to the invention has the advantage of being able to be easily adapted to the vacuum requirement of the user sites.

Thus, when the vacuum requirement at the user sites is medium or high, the vacuum pumps are controlled to operate continuously for a predetermined duration, for example one hour, which permits, on the one hand, ensuring a vacuum level below a maximum value, for example 46,000 Pa, and this despite the large demand of the user sites and, on the other hand, to avoid incessantly starting and stopping of vacuum pumps, as happened with the installations of the prior art.

Conversely, when the vacuum requirement for the user sites is low, the vacuum pumps are operated for a minimum predetermined duration, for example 20 minutes.

In this case, if the value of underpressure falls below a predetermined minimum value, for example below 35,000 Pa, whilst as the case may be the vacuum pump or pumps are stopped, having operated for a time period greater than or equal to the predetermined period of operation, for example, the pumps having operated more than 20 minutes, whilst the pumps not having yet reached this predetermined operation in time continue to operate, whilst opening one or several of the electrovalves EV1 and EV2 arranged below the lines L1 and L2 for communication with the atmosphere, which then gives rise to an intake of a flow of atmospheric air into the vacuum line.

Entry of the air into the vacuum line then gives rise to an artificial increase in the pressure in the vacuum conduit, which permits overcoming the low demand of the user sites and permits moreover both maintaining the value of underpressure between minimum and maximum desired values of underpressure within the vacuum line 2, and continuing to let the vacuum pumps operate, without risk of these being damaged.

So as better to control the flow rate of the flow of air entering by one or the other of the lines L1, L2 for connection to the atmosphere, said lines L1, L2 for connection to the atmosphere comprise calibrated orifices OC1 and OC2, respectively, of the same diameter or of different diameters, for example calibrated orifices having a diameter corresponding to half the nominal flow rate of a vacuum pump for a pressure of 34,000 Pa.

By way of example, the calibrated orifices can have a diameter from 2 to 10 mm.

When the vacuum requirement for the user sites is really quite low, it may be necessary to increase the quantity of air flow introduced into the vacuum line to be able to compensate the level of underpressure within the vacuum conduit by avoiding stopping one or several vacuum pumps.

To do this, the increase in the quantity of air introduced into the vacuum conduit can be obtained by causing the vacuum conduit to communicate with the atmosphere by the bias of the two lines L1 and L2 for communication with the atmosphere, each provided with a calibrated orifice, if desired of different calibers.

The installation of the invention is controlled by pilot means MP, for example a programmable computer, which manages the data gathered by the pressure detector or detectors C1 and/or C2 and controls as a function of the values of pressure measured in the vacuum conduit or conduits, the starting and/or stopping of the vacuum pumps, the opening and/or closing of the electrovalves EV1 and/or EV2, which his to say the phases of placing the vacuum conduit into communication with the atmosphere, the duration of opening of the electrovalves EV1 and EV2 or of operation of each of the vacuum pumps.

Moreover, the computer can also serve to detect possible blocking of the filters and/or be connected to a remote control system for the operation of the installation and/or to manage or more alarms, particularly alarms permitting surveillance of the good operation of the pumps and their starting according to given cycles.

It follows that the device according to the invention has several advantages relative to the existing devices, namely:

it is of reduced size, given that it uses only a single buffer capacity of reduced volume;

it permits omitting electrovalves at the intake of the vacuum pumps, which electrovalves are considered to be, on the one hand, less reliable and create large pressure drops, and, on the other hand, are cumbersome;

it can be adjusted whilst decreasing the operating time of the vacuum pumps thanks to the presence of a larger number of vacuum pumps having a lower flow rate and two lines of communication with the atmosphere controlled by electrovalves EV1 and EV2 disposed in a T relative to the vacuum conduit CV;

there is obtained an increase of output of the order of 10% for each of the vacuum pumps;

the flexibility of the installation is increased and this no matter what the flow rate at the user sites;

it increases the safety thanks to the larger number of pumps, thus, in case of failure of one of the pumps, the other pumps present can take up the slack; and it permits the use of a pump "with water" with liquid rings, such as pumps sold by the SIEMENS company under the mark ELMO L;

it permits, in certain cases, increasing the water autonomy of the pumps with liquid rings of this type, by the introduction of moist air through the lines L1 and L2, for example compressed by the pumps at the vacuum limit; and it permits avoiding causing the pumps to operate at the vacuum limit (the case of FIG. 2, when the electrovalves EV are closed) because that could give rise to problems of lubrication of said pumps or require the use of troublesome synthetic oils.

Moreover, although in FIG. 3, the lines L1 and L2 are positioned between the buffer capacity CP and the vacuum pumps P1 to P4, it is also possible, or even desirable, in certain cases, to place them between said buffer capacity CP and the site or sites of vacuum use.

The present invention permits controlling efficaciously one or several vacuum conduits particularly within a hospital building, such as a hospital, a clinic, a rest home or, as the case may be, in a research building or a laboratory.

What is claimed is:

1. Process for regulating the level of underpressure prevailing in at least one portion of at least one vacuum conduit, in which said level of underpressure is susceptible of variation with time, which comprises:

(a) determining an underpressure value (VD) prevailing in at least one portion of the vacuum conduit, (b) comparing the value of underpressure (VC) determined in step (a) with a predetermined maximum value of underpressure (VDmax) wherein $VDmax<10^5$ Pa, (c) when in step (b) VD>VDmax, causing a decrease in pressure in said vacuum conduit by pneumatic pumping by means of several vacuum pumps connected pneumatically to at least one portion of said vacuum conduit, (d) when the value of the underpressure (VD) prevailing in at least one portion of the vacuum conduit subjected to pumping in step (c) is such that VD≦VDmini, wherein VDmini is a predetermined minimum value of underpressure wherein $VDmini<VDmax<10^5$ Pa, (i) stopping at least one vacuum pump that has operated for a predetermined duration (dt); and (ii) placing at least a portion of said vacuum conduit in pneumatic communication with a source of gas having a compensation pressure (Pc) such that Pc>VDmax, while continuing to operate pneumatic pumping by means of at least one vacuum pump connected pneumatically to at least one portion of said vacuum conduit.

2. The process according to claim 1, wherein in step (d), the source of gas having a compensation pressure (Pc) is the atmosphere.

3. The process according to claim 2, wherein in step (d), the placing in pneumatic communication of the vacuum conduit with the atmosphere is carried out by at least one line (L1, L2) communicating with the atmosphere, having a first end connected pneumatically to said vacuum conduit and having a second free end.

4. The process according to claim 1, wherein the passage of the gaseous flow in at least one line (L1, L2) communicating with the atmosphere is controlled by a control means (EV1, EV2) for the passage of fluid arranged in at least said line communicating with the atmosphere, and the flow rate of passage of the gaseous flow through said one line (L1, L2) communicating with the atmosphere is effected by at least one calibrated orifice (01, 02) arranged in said line (L1, L2) communicating with the atmosphere.

5. The process according to claim 1, wherein:

VDmini is comprised between 30,000 Pa and 38,000 Pa;

VDmax is comprised between 42,000 Pa and 50,000 Pa; and/or dt is comprised between 1 and 120 minutes.

6. The process according to claim 5, wherein dt is comprised between 5 and 90 minutes.

7. The process according to claim 1, wherein said at least one vacuum conduit is a part of a network of vacuum conduits traversing a hospital building.

8. The process according to claim 1, wherein from 2 to 15 vacuum pumps (P1, P2, P3, P4) are pneumatically connected to the vacuum conduit (CV).

9. The process according to claim 1, wherein several of said vacuum pumps are arranged in parallel.

10. The process according to claim 4, wherein the control means (EV1, EV2) for controlling the passage of fluid are selected from the group consisting of electrovalves and pneumatic valves.

11. Proces s according to claim 3, wherein control means (EV1, EV2) for controlling the passage of fluid are controlled by a pilot device (MP), in a combined or autonomous manner.

* * * * *